Figure 1:
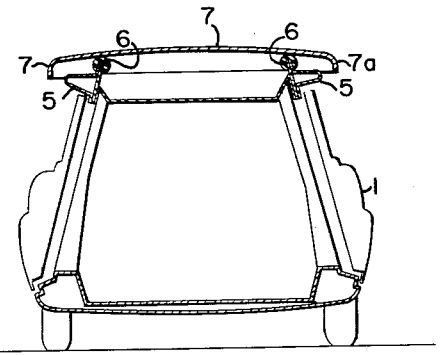

Jan. 2, 1962   B. BARÉNYI   3,015,519

MOTOR VEHICLE ROOF CONSTRUCTION

Filed June 22, 1959

INVENTOR
BÉLA BARÉNYI

BY Dicke, Craig and Freudenberg
ATTORNEYS

3,015,519
MOTOR VEHICLE ROOF CONSTRUCTION
Béla Barényi, Stuttgart-Vaihingen, Germany, assignor to Daimler-Benz Aktiengesellschaft, Stuttgart-Unterturkheim, Germany
Filed June 22, 1959, Ser. No. 821,773
Claims priority, application Germany June 21, 1958
4 Claims. (Cl. 296—137)

The present invention relates to an improvement and further development of roofs, especially of flat or slightly arcuate roofs for motor vehicles provided with a top that is relatively shorter with respect to the lower vehicle superstructure or vehicle body, in which the roofs, for purposes of ventilation, are adapted to be lifted or pivoted on one side thereof.

The present invention essentially consists in that the entire roof rests freely, exclusively by the interposition of a sealing strip directly on the upper rim portion of the vehicle top, and in that the roof, at least one three sides thereof, preferably in front and on the lateral sides thereof extends a predetermined distance beyond the top. The roof in accordance with the present invention thereby extends beyond the top in front and possibly also in the rear thereof by such a distance that hinges, roof guide means or similar securing means for the roof which are located on the outside of the top of the vehicle, may still be readily accommodated below the roof. The rim portion of the roof is thereby bent preferably along the entire periphery thereof, a short distance, for example, in the downward direction thereof. The vehicle top is provided with a special rim-reinforcing frame. This frame is thereby preferably constructed as hollow frame and extends essentially horizontally toward the outside of the vehicle. The hinges, guide means and lifting arrangements for the roof are arranged and secured at this roof frame. The arrangement in accordance with the present invention may thereby be made in such a manner that the roof may be lifted vertically as a unit or lifted only along one side thereof, especially in front and/or in the rear thereof. Such arrangements may be realized thereby by any known conventional means.

Large-spaced motor vehicles such as trucks are known in the prior art in which a roof hatch or aperture having an upwardly-bent sash rim-portion is provided, and on which is supported a roof of only slightly curved configuration which extends considerably over the sash rim-portion. However, this prior art arrangement does not disclose or even suggest a roof construction for the usual conventional small passenger motor vehicle. The roof construction according to the present invention offers for such small passenger motor vehicles the advantage of a simple and inexpensive construction. Furthermore, the roof construction in accordance with the present invention is also independent of the particular type of vehicle body construction used with the vehicle. Moreover, the roof construction in accordance with the present invention protects, with certainty and reliability, against the penetration of dirt or dampness into the vehicle interior space and also enables an effective ventilation of the vehicle in a simple manner. In particular, a vehicle provided with a roof construction in accordance with the present invention may be built of a low height and at such low cost as was unknown heretofore in the motor vehicle constructions.

Accordingly, it is an object of the present invention to provide a roof construction for a motor vehicle, which is simple and inexpensive in construction and which is independent of the type of vehicle body of the motor vehicle.

Still another object of the present invention resides in the provision of a particularly appropriate roof construction for motor vehicle roofs of only slightly curved or flat construction and which may be lifted in a simple manner so as to ventilate the vehicle effectively.

Another object of the present invention resides in the provision of a roof construction for a motor vehicle in which the roof merely rests by the interposition of sealing strips on an especially constructed frame provided along the upper end of the vehicle top.

A further object of the present invention resides in the provision of a roof construction for motor vehicles which effectively and reliably protects the vehicle interior space against dirt, water and dampness.

Figure 2:
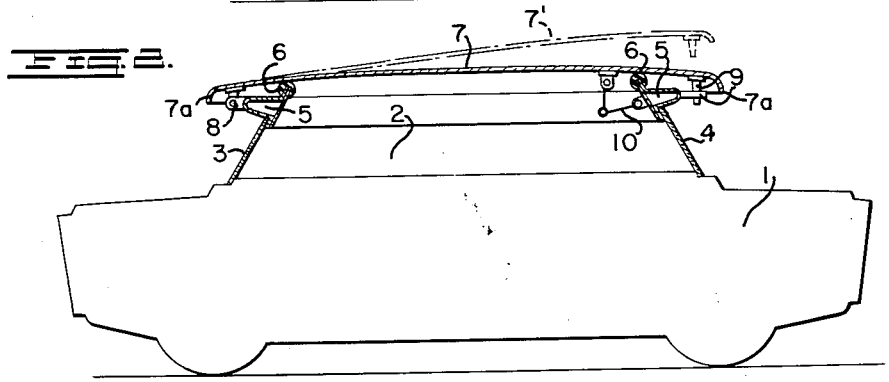
Figure 3:
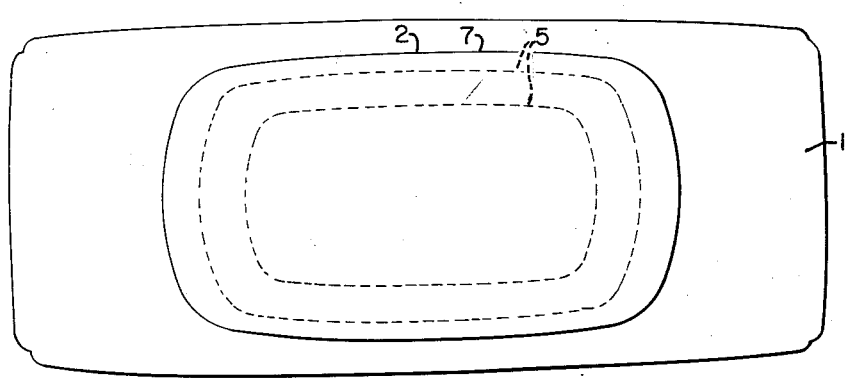

These and other objects, features and advantages of the present invention will become more obvious from the following description when taken in connection with the accompanying drawing which shows, for purposes of illustration only, one embodiment in accordance with the present invention and wherein:

FIGURE 1 is a transverse cross sectional view through a motor vehicle provided with a roof construction in accordance with the present invention, FIGURE 2 is a longitudinal cross sectional view through the motor vehicle illustrated in FIGURE 1 and provided with a roof construction in accordance with the present invention, and FIGURE 3 is a top plan view of the motor vehicle in accordance with the present invention as illustrated in FIGURES 1 and 2.

Referring now to the drawing wherein like reference numerals are used throughout the various views to designate corresponding parts, the motor vehicle illustrated in the three views of the drawing comprises a relatively low, pontoon-shaped vehicle body 1 of any known appropriate construction and provided with a shorter, possibly tapering top 2 which may be provided, for example, with a forward windshield 3 and a rear window 4. The vehicle body 1 may thereby be of any appropriate known construction. The top 2 is reinforced in the upper part thereof by a roof frame 5, particularly of hollow construction which is of annular shape and extends outwardly of the vehicle in an essentially horizontal direction. Only the annular sealing strip 6 protrudes beyond the roof frame 5 in the vertical direction. Otherwise, the roof frame 5 has an essentially horizontal upper contour. The roof 7 which may be of flat or of only slightly curved configuration rests on the sealing strip 6. The roof 7 extends a considerable distance at least on three sides thereof, and more particularly in front and on the two lateral sides of the vehicle beyond the roof frame 5. In the embodiment illustrated in the drawing, the roof 7 also extends a considerable distance beyond the roof frame 5 in the rear of the vehicle. The rim portion 7a of the roof 7 is bent downwardly a short distance as indicated in FIGURES 1 and 2. One or several roof hinges 8 are provided in front of the roof 7 below the same and outside the roof frame 5. The hinges may thereby be of any known suitable construction.

In a similar manner, a guide pin arrangement 9 is arranged outside the roof frame 5 below the roof 7 at the rear end thereof. A suitable latching device, detent mechanism or the like may also be substituted for the guide pin arrangement 9 or may be provided in addition thereto. Furthermore, one or several roof lifting devices 10 are arranged on the inside of the top 2 which may be of any suitable construction, for example of a toggle type lifting arrangement which may be locked so as to prevent unauthorized lifting of the roof from the outside thereof. Each roof lifting device 10 may be of any suitable construction and may be adapted to be actuated manually and/or by means of electric, hydraulic or pneumatic power assists.

The hinges, guide means and lifting devices which may be used in accordance with the present invention and which may be of any suitable construction are thereby secured to the roof frame 5 by conventional means.

The present invention may also be modified by reversing the arrangement of the sealing strip 6 in securing the same to the lower side of the roof 7 instead of to the upper surface of the roof frame 5.

For purposes of ventilation, the roof 7 may be brought into the position 7' thereof as illustrated in dot and dash line in FIGURE 2.

The vehicle rim portion 7a of the roof 7 may also be bent in such a manner that it extends upwardly along the front and lateral sides thereof whereas it is bent downwardly along the rear end thereof. The upwardly bent rim portion of the roof would thereby prevent a running off of the rain water in a downward direction over the windshield 3, especially while driving downhill or during standstill of the vehicle with a downward forward inclination.

The sealing strip 6 may be of any suitable material, such as rubber or synthetic plastic material or the like and may be secured to the roof frame 5 or to the lower side of the roof 7 in any suitable known manner, for example, by suitable fastening means and/or vulcanizing, gluing, bonding, cementing or the like.

While I have shown and described one embodiment in accordance with the present invention, it is understood that the same is not limited thereto but is susceptible of many changes and modifications within the spirit and scope of the present invention and, I, therefore, do not wish to be limited to the embodiment described and illustrated herein but intend to cover all changes and modifications as are encompassed by the scope of the appended claims.

I claim:

1. An adjustable roof construction for motor vehicles provided with a vehicle body having windows and terminating in an upwardly direction in a substantially annular support surface, a vehicle roof adapted to be supported on said support surface, said roof having portions projecting outwardly beyond said support surface on all sides and having an essentially flat under surface in the region of said support surface, sealing means secured to one of the two parts consisting of said roof and of said support surface, the entire roof resting on said support surface excluively by the interposition of said sealing means, means to protect at least some of said windows from rain and sun, said means including portions of said roof projecting beyond said support surface, hinge means for said roof secured to said roof at the front end of said vehicle body at the outside thereof, said projecting portions of said roof extending beyond said vehicle body such a distance that said hinge means are located underneath said roof.

2. An adjustable roof construction according to claim 1, wherein said roof is provided with a rim portion bent downwardly at least on three sides thereof.

3. An adjustable roof construction according to claim 1, wherein said roof, when viewed from the top, may be made of a shape independently of the shape of said upper limiting surface when viewed from the top thereof.

4. An adjustable roof construction according to claim 1, further comprising essentially horizontal hollow frame means reinforcing said support surface.

References Cited in the file of this patent

UNITED STATES PATENTS

| | | |
|---|---|---|
| 1,271,745 | Muller | July 9, 1918 |
| 1,348,593 | Spiegel | Aug. 3, 1920 |
| 1,455,994 | Cowan | May 22, 1923 |
| 1,686,587 | Weiss | Oct. 9, 1928 |
| 1,703,118 | McCulley et al. | Feb. 26, 1929 |

FOREIGN PATENTS

| | | |
|---|---|---|
| 554,066 | Germany | Mar. 17, 1934 |
| 523,355 | Great Britain | July 12, 1940 |